(12) United States Patent
Yuan et al.

(10) Patent No.: US 6,995,547 B2
(45) Date of Patent: Feb. 7, 2006

(54) LOW LOSS BOOST CONVERTER

(75) Inventors: Shiliang Yuan, Guangdong (CN); Hua Xiang, Guangdong (CN)

(73) Assignee: Emerson Network Power Co., Ltd., (CN)

( * ) Notice: Subject to any disclaimer, the term of this patent is extended or adjusted under 35 U.S.C. 154(b) by 0 days.

(21) Appl. No.: 10/997,798

(22) Filed: Nov. 24, 2004

(65) Prior Publication Data

US 2005/0135123 A1  Jun. 23, 2005

Related U.S. Application Data

(63) Continuation of application No. PCT/CN03/00298, filed on Apr. 24, 2003.

(30) Foreign Application Priority Data

May 27, 2002  (CN) .............................. 02121904 A

(51) Int. Cl.
*G05F 1/613* (2006.01)

(52) U.S. Cl. .................................... 323/222

(58) Field of Classification Search ................. 323/222
See application file for complete search history.

(56) References Cited

U.S. PATENT DOCUMENTS

| 5,550,458 | A | | 8/1996 | Farrington et al. ......... 323/222 |
| 5,654,626 | A | * | 8/1997 | Karlsson .................... 323/222 |
| 5,757,635 | A | | 5/1998 | Seong ......................... 363/89 |
| 5,793,190 | A | * | 8/1998 | Sahlstrom et al. .......... 323/222 |
| 5,847,548 | A | * | 12/1998 | He et al. .................... 323/222 |
| 6,008,630 | A | * | 12/1999 | Prasad ........................ 323/222 |
| 6,498,463 | B2 | * | 12/2002 | Chang ........................ 323/222 |

FOREIGN PATENT DOCUMENTS

JP         8317635 A      11/1996

* cited by examiner

*Primary Examiner*—Jeffrey Sterrett
(74) *Attorney, Agent, or Firm*—Harness, Dickey & Pierce, P.L.C.

(57) ABSTRACT

The present invention relates to a low loss boost circuit used in power conversion equipment of power supplies or other power systems. It comprises controlling a duty cycle of a power switch; realizing voltage boosting and regulating of the output voltage through the energy storage in a boost inductor; reducing the reverse recovery current using an auxiliary inductor, wherein a secondary winding of the inductor supplies additional energy thereto and provides a path for transferring the energy from the auxiliary inductor to the energy storage capacitor. The present invention has high efficiency and is suitable for power converter with PFC, such as, telecommunication power supply and uninterrupted power supply.

5 Claims, 3 Drawing Sheets

LOW LOSS BOOST CONVERTER

CROSS-REFERENCE TO RELATED APPLICATIONS

This application is a continuation of International Application No. PCT/CN03/00298 filed on Apr. 24, 2003. This application claims the benefit of Chinese Patent Application No. 02121904.4 filed on May 27, 2002. The disclosures of the above applications are incorporated herein by reference.

FIELD OF THE INVENTION

The present invention relates generally to a power converter used in a power supply or a similar electrical power system, and, more particularly to a low loss boost converter.

BACKGROUND ART

A single-phase power factor correction (PFC) circuit is widely used in switching power supplies energized using commercially supplied power, such as in telecommunication power supplies, uninterrupted power supplies (UPS), and the like. FIG. 1 depicts an exemplary, known power factor correction circuit for enabling input current to meet the International Engineering Consortium (IEC), requirements relevant to a harmonic current standard and for setting the power factor approximately to unity.

A single-phase power factor correction circuit generally utilizes a boost converted or boost circuit. A traditional boost converter operates as follows:

1. The duty cycle of power switch S1 is controlled by controlling on and off periods of power switch S1, to provide a boost function and a voltage regulation function for the output voltage. The output voltage may be described with the following equation: $V_O = V_{IN}/d$, wherein d is the duty cycle of the power switch S1.
2. When the power switch S1 is on, an input voltage is applied across the two ends of an inductor Lm to charge Lm and store energy therein. Thus, the current through Lm rises, and freewheeling diode D is reverse biased and turned off.
3. When the power switch S1 is off, freewheeling diode D turns on because the induced current through Lm cannot change abruptly. The input voltage is connected to inductor Lm in series and a current passing through freewheeling diode D supplies power to the output capacitor Co and a load (not shown), reducing the induced current through Lm.

The boost circuit of FIG. 1 has certain features which can be less than desirable. For example, when power switch S1 is turned off, freewheeling diode D turns on, and a positive current flows through it. When the power switch S1 is on, a negative voltage is provided across freewheeling diode D. Freewheeling diode D cannot then be turned off immediately because of the recovery effect of the freewheeling diode D. Current can then flow through reverse biased freewheeling diode D, forming a reverse recovery current. The reverse recovery current and the current through the inductor Lm flow through power switch S1, thereby increasing loss when power switch S1 turns on, and also increasing the loss of freewheeling diode D. When the output voltage rises, the above-described effect increases because the time of reverse recovery of the diode increases. The higher the switching frequency of power switch S1, the greater the loss caused by the reverse recovery current. The above-described effect thus limits the operating frequency of the circuit.

To address the above-described limitations, an auxiliary inductor is connected in series with freewheeling diode D to reduce the reverse recovery current. The auxiliary inductor, however, can only be used to reduce the reverse recovery current, but does not reduce the energy associated with the reverse recovery current. An additional capacitor may be required to store the reverse recovery energy until the freewheeling diode D turns on again and supplies the output capacitor Co with the stored energy. The addition of a storage capacitor provides a second circuit branch for the current of inductor Lm circuit. When the current through inductor Lm is relatively high, all current flowing in the second branch circuit may not be transferred to the branch circuit of the auxiliary inductor when power switch S1 turns off because the reverse recovery energy in the storage capacitor may not be sufficient. Therefore, auxiliary inductor Ls cannot completely reduce the reverse recovery current.

SUMMARY OF THE INVENTION

An object of the present invention is to provide a method and apparatus for a low loss boost circuit or converter. In particular, this invention is directed to a method for boosting voltage with a low loss boost circuit including controlling a duty ratio cycle of a power switch S1 and realizing voltage boosting and regulating of the output voltage through the energy storage of an inductor connected in parallel with the power switch; reducing a reverse recovery current of a freewheeling diode of an auxiliary inductor connected in series with the power switch freewheel diode. A secondary winding of the inductor is connected to a storage capacitor to supply additional energy thereto, and to provide a path for transferring the energy from the auxiliary inductor Ls to storage capacitor Cb. The present method of boosting voltage reduces the loss of the reversed recovery current through the steps of: 1) the storage capacitor obtaining additional energy via the secondary winding of the inductor while storing the reverse recovery energy after the power switch turns on; and 2) the storage capacitor transferring the stored reversed recovery energy and additional energy to an output capacitor during the freewheeling stage after the power switch turns off.

This invention is also directed to a low loss boost circuit having a boosting circuit including a power switch, an inductor, a freewheeling diode and an output capacitor, wherein the freewheeling diode is in series connection with an auxiliary inductor. The circuit further includes a special energy storage circuit including the auxiliary inductor, a storage capacitor, and first and second auxiliary diodes, and a secondary winding of the inductor. The first and second auxiliary diodes are connected between the secondary winding and the cathode of the freewheeling diode in series; the storage capacitor is arranged between the junction of the first auxiliary diode and the second auxiliary diode and the junction of the freewheeling diode and the auxiliary inductor. The boost circuit may also include energy storage component having a third auxiliary diode, the anode of which connects to the junction of the auxiliary inductor and the power switch, and the cathode of which connects to the cathode of the freewheeling diode D.

Some of the various advantages of the present invention will be described. The secondary winding of the inductor supplies energy to a storage circuit. Secondary winding Lmf and the inductor cooperate to emulate a voltage transformer to supply energy to the storage capacitor and to provide a path for transferring the energy from the auxiliary inductor to the storage capacitor. The secondary winding supplies a transferred energy, that varies with the input voltage, and also supplies a storage path for the reverse recovery energy of the auxiliary inductor. When the power switch is turned off, all of the freewheeling currents are transferred to the branch circuit containing the auxiliary inductor and the diode connected in series. At the same time, the stored energy from the reverse recovery current is transferred to the output capacitor such that no energy loss will occur, thereby improving the efficiency of the circuit. The present invention thus addresses a disadvantage in prior art, namely, the whole energy cannot be transferred completely efficiently.

Benefits of the present invention include improved and relatively high efficiency. Furthermore, the amount of the stored transferred energy varies with the input voltage. The higher the input voltage, the higher the stored transferred energy. Conversely, the less the input voltage, the less the stored transferred energy. When the alternative input voltage is near zero, the stored transferred energy is relatively low such that an abrupt rise of voltage across the storage capacitor is avoided, and will prevent a large stress of peak voltages across the freewheeling diode, and will improve the efficiency and reliability of the boost circuit.

In sum, the present invention has a high and enhanced efficiency, and it is applicable to power switching devices with input of commercial power, such as, communication telecommunication power and UPS.

BRIEF DESCRIPTION OF THE DRAWINGS

The present invention will become more fully understood from the detailed description and the accompanying drawings, wherein.

DETAIL DESCRIPTION OF PREFERRED EMBODIMENTS

The following description of the preferred embodiment(s) is merely exemplary in nature and is in no way intended to limit the invention, its application, or uses.

According to the accompanying drawings and examples, the present invention is further described in detail hereinafter.

Figure 1:
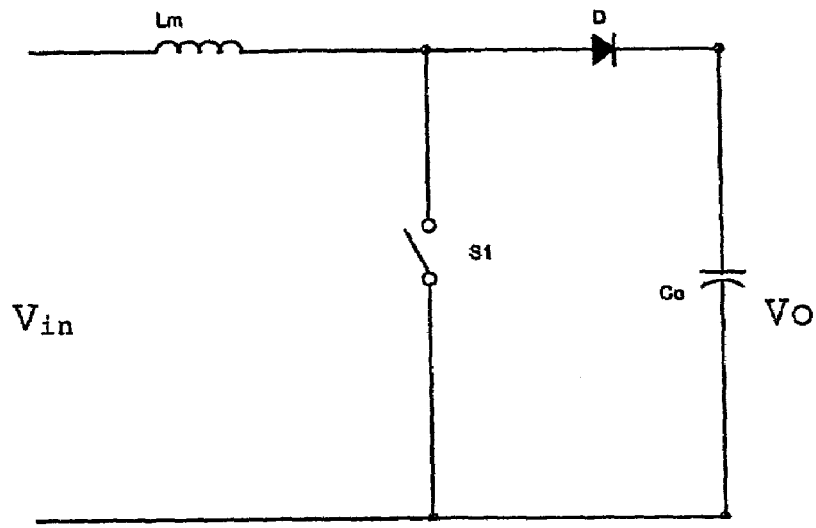
FIG. 1 is a schematic view illustrating an existing boosting circuit.
Figure 2:
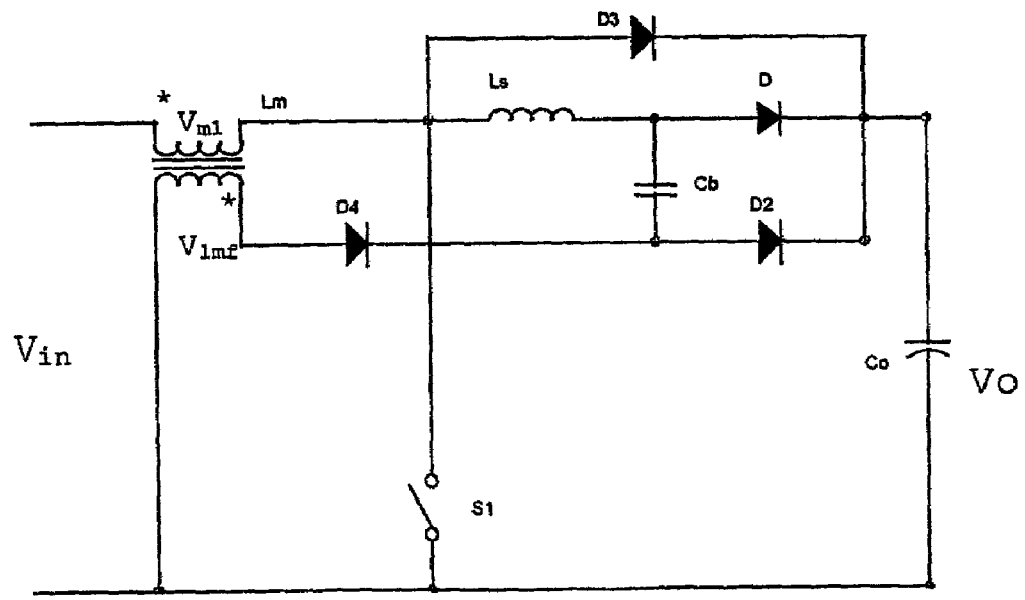
FIG. 2 is a schematic view illustrating a circuit of the present invention.
Figure 4:
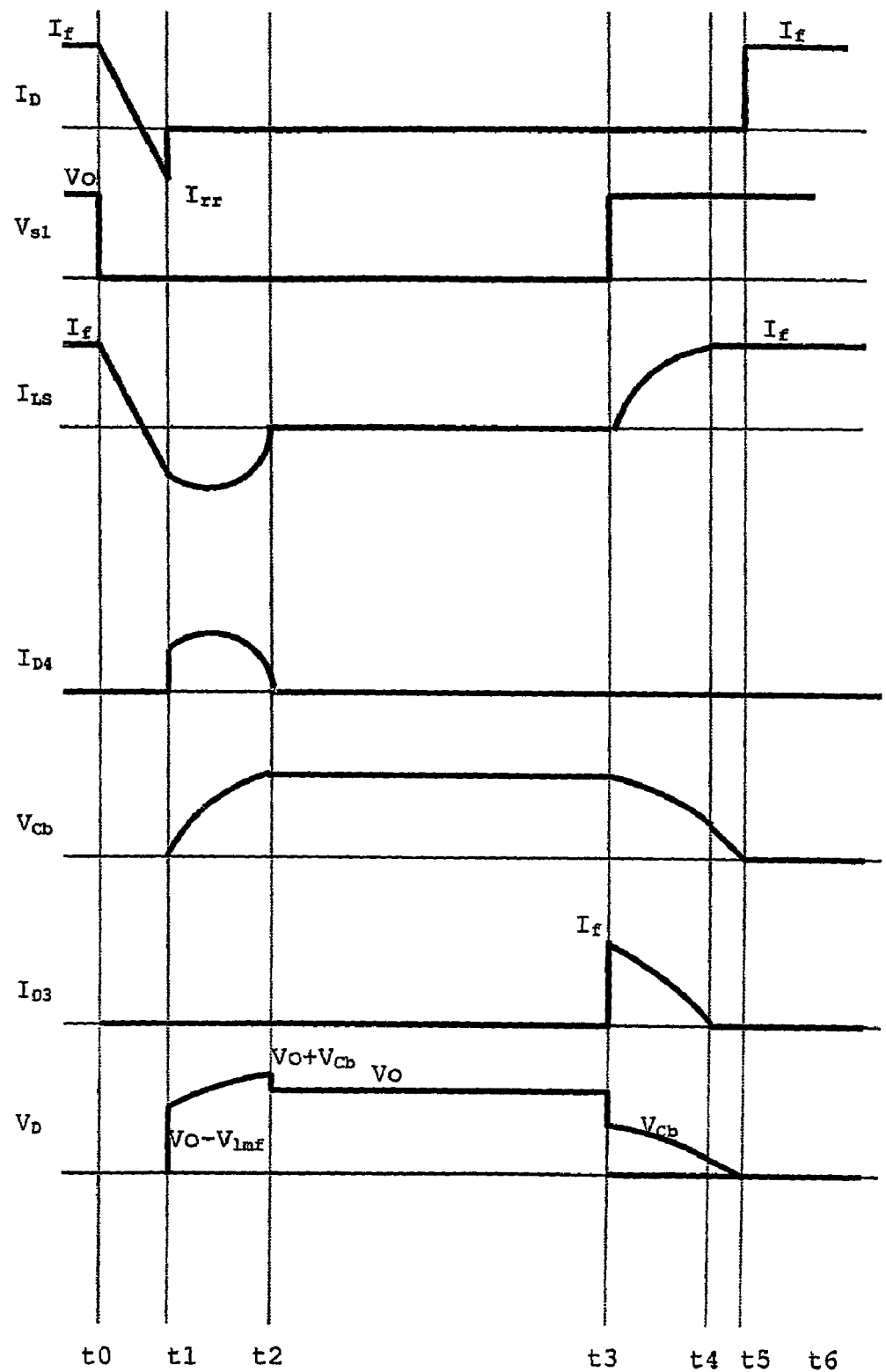
FIG. 4 is a schematic view illustrating the operational time sequence of a circuit of the present invention.

FIG. 2 and FIG. 4 depict a boost circuit or boost converter arranged in accordance with principles of the present invention. The present invention includes controlling the duty cycle of power switch S1 by controlling on and off periods of power switch S1; realizing voltage boosting and regulating of output voltage Vo through the energy storage of inductor Lm; reducing the reverse recovery current of the freewheeling diode D by using auxiliary inductor Ls; and using secondary winding Lmf of inductor Lm to supply energy to an energy storage circuit. When switch S1 is on, secondary winding Lmf and inductor Lm work in a way equivalent to a voltage transformer to supply the energy to the storage capacitor Cb and to provide a path for transferring energy from auxiliary inductor Ls to storage capacitor Cb.

FIG. 2 shows the detailed circuit structure, comprising a basic boost converter circuit including power switch S1, inductor Lm, freewheeling diode D, and output capacitor Co, where diode D is in series connection with auxiliary inductor Ls. The boost converter circuit further comprises a circuit for energy storage connected between both negative and positive ends of freewheeling diode D and ground. The energy storage circuit includes auxiliary inductor Ls, storage capacitor Cb, first and second auxiliary diodes D2, D4, and secondary winding Lmf of inductor Lm. Diode D2 and diode D4 are connected in series between secondary winding Lmf and the cathode of freewheeling diode D. Storage capacitor Cb is arranged between the junction which connects first auxiliary diode D2 and second auxiliary diode D4 and junction which connects freewheeling diode D and auxiliary inductor Ls. The energy storage circuit is also provided with a third auxiliary diode D3 connecting to the junction which connects auxiliary inductor Ls and power switch S1. The cathode of third auxiliary diode D3 connects to the cathode of the freewheeling diode D.

Operation of the present invention is described in connection with the following analysis.

As shown in FIG. 2, when power switch S1 is on, the primary voltage across inductor Lm is the input voltage Vin. Voltage Vlmf of the secondary winding Lmf is proportional to the primary input voltage Vin. The direction of the voltage is consistent with the direction of dotted terminals. The formula is given below:

$$V_{lm1}=V_{in}; \ V_{lmf}=V_{in}/n,$$

wherein n is the ratio of the number of turns between the primary side and the secondary side of inductor Lm.

To simplify the analysis of the circuit, the following assumptions are made during a switching cycle:
1. Output capacitor Co is sufficiently large; and the output voltage Vo is considered as a constant direct voltage;
2. All power devices are ideal devices except freewheeling diode D;
3. The inductance of the inductor Lm is much higher than the inductance of auxiliary inductor Ls; and
4. The input voltage $V_{in}$ is a constant.

Based on the above assumptions, an operational cycle of the circuit can be divided into 6 segments of time to be analyzed respectively, and the operational time sequence of the circuit is shown in FIG. 4, wherein ID is current of the freewheeling diode D, If is the current of the inductor Lm, Vo is the output voltage, Vs1 is the voltage across the power switch S1, ILs is the current passing through the auxiliary inductor Ls, ID4 is the current through the diode D4, VCb is the voltage across the storage capacitor Cb, ID3 is the current through diode D3, VD is the voltage across freewheeling diode D, and Irr is the maximum value of the reverse recovery current.

First Segment of Time (t0–t1):

At t0, power switch S1 is turned on, a reverse recovery current flows through freewheeling diode D, and the auxiliary inductor Ls is connected in series with freewheeling diode D to reduce the reverse recovery current. The input inductance is also equivalent to the operational mode of the transformer during the energy storing stage of the inductor.

Second Segment of Time (t1–t2):

At t1, freewheeling diode D is turned off, the reversed recovery stops. The amount of energy stored in the auxiliary inductor Ls is $\frac{1}{2}*Ls*I_{rr}^2$, wherein $I_{rr}$ is the maximum value of the reverse recovery current. At this time, diode D4 turns on, and current flows through a directional path of $V_{lmf}$-D4-Cb-Ls-S1-$V_{lmf}$, which forms a resonant circuit path. At t2, the current through the auxiliary inductor Ls drops to zero, and all the energy stored in the auxiliary inductor Ls is transferred to the energy storage capacitor Cb.

At this moment, the energy stored in the storage capacitor is:

$$E_{Cb}=\frac{1}{2}*Ls*I_{rr}^2+Cb*V_{lmf}^2+Cb*V_{lmf}*(V_{lmf}^2+I_{rr}^2*Ls/Cb)^{1/2};$$

The voltage across the storage capacitor Cb is:

$$V_{cb}=(V_{lmf}^2+I_{rr}^2*Ls/Cb)^{1/2}+V_{lmf}$$

The voltage across the freewheeling diode D is:

$$V_d=Vo+V_{cb}-V_{lmf}=Vo+(V_{lmf}^2+I_{rr}^2*Ls/Cb)^{1/2};$$

Third Segment of Time (t2–t3):

At t2, diode D4 is turned off naturally, and the voltage across the energy storage capacitor Cb remains unchanged. Power switch S1 in the power factor correction (PFC) circuit enters the normal operational stage "on".

Fourth Segment of Time (t3–t4):

At t3, power switch S1 is off, and since the current If through the inductor Lm cannot change abruptly, the diode D3 is then on. The current If flows through diode D3 to the output capacitor Co, at the same time, diode D2 is turned on, and the current flows through a path of Ls-Cb-D2, forming a resonant circuit path, such that the current passing through auxiliary inductor Ls increases gradually, the voltage across storage capacitor Cb decreases gradually, and the current in the branch circuit of diode D3 is gradually transferred to the branch circuit of the auxiliary inductor Ls.

Fifth Segment of Time (t4–t5):

At t4, the current through auxiliary inductor Ls increases to the current If of the inductor Lm, all currents are transferred to the branch circuit of auxiliary inductor Ls, diode D3 is turned off naturally, the current If flows constantly through the path Ls-Cb-D2, whereby the voltage across the storage capacitor Cb continues to drop.

Sixth Segment of Time (t5–t6):

At t5, the voltage across storage capacitor Cb drops to zero, freewheeling diode D is turned on, diode D2 is turned off naturally, power switch S1 in the power factor correction (PFC) circuit enters the normal operational stage of "off" and "freewheeling." At this moment, the voltage of storage capacitor Cb is zero and remains unchanged.

From the above-mentioned circuit analysis, one skilled in the art will recognize that the reverse recovery current is transferred to the output capacitor Co through the energy storage circuit, and no energy loss occurs, thereby improving the efficiency of the whole circuit.

From the energy stored in the storage capacitor Cb, namely, $E_{cb}=\frac{1}{2}*Ls*I_{rr}^2+Cb*V_{lmf}^2+Cb*V_{lmf}*(V_{lmf}^2+I_{rr}^2*Ls/Cb)^{1/2}$, it can be seen that the stored, transferred energy includes not only the reverse recovery energy but also a part of the energy transferred from the secondary winding Lmf. This part of transferred energy can assure that the freewheeling current is transferred fully to the branch circuit containing the auxiliary inductor Ls and the diode D connected in series after the power switch S1 is off.

It is also known from the above formula that the stored transferred energy varies with the input voltage $V_{in}$. The more input voltage $V_{in}$ rises, the more transferred energy is stored. Conversely, the more input voltage $V_{in}$ drops, the less transferred energy is stored. Such a feature is apparently advantageous to the power factor correction (PFC) circuit.

In a power factor correction circuit, the input current is a sinusoidal wave and in a phase consistent with that of the commercial sinusoidal voltage. Within a cycle of the commercial power, the current $I_f$ through the inductor Lm varies with the instantaneous value of the commercial sinusoidal voltage. The higher the input voltage $V_{in}$, the greater the current $I_f$ becomes, and the greater the current needs to be transferred. The lower the input voltage $V_{in}$, the lesser the current $I_f$ becomes, and the smaller the current needs to be transferred. In other words, the transferred energy stored in storage capacitor Cb varies with the current $I_f$. When the input voltage $V_{in}$ is near its peak, a greater amount of transferred energy can be stored so that the current $I_f$ is efficiently transferred to the branch circuit containing auxiliary inductor Ls and diode D connected in series. When the input voltage $V_{in}$ approaches zero, the stored, transferred energy is relatively small so that an abrupt rise of the voltage across storage capacitor Cb is avoided, and will not cause a large stress of the peak voltage across freewheeling diode D.

Figure 3:
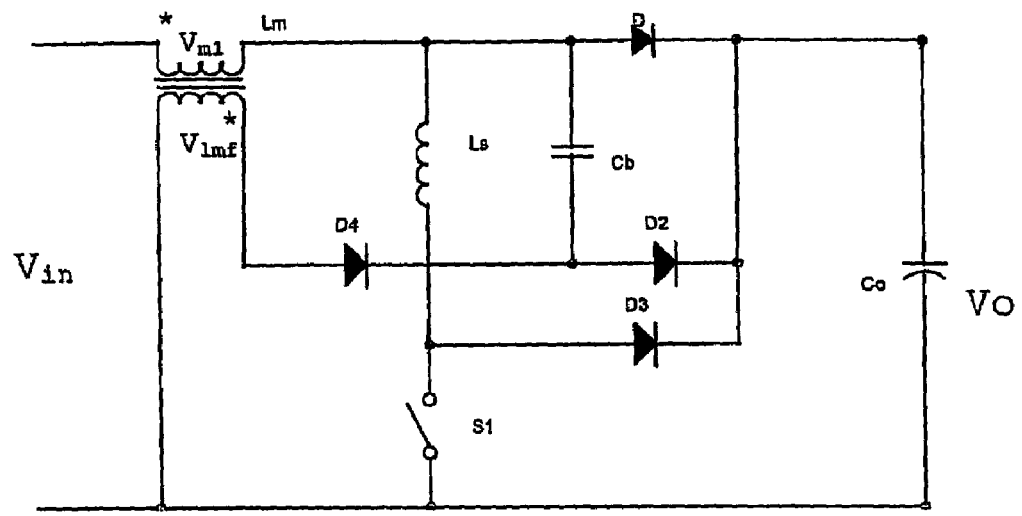
FIG. 3 is a schematic view illustrating a circuit of the present invention.

To this invention, the circuit structure can be the one as shown in FIG. 3, and it is similar to that shown in FIG. 2. The working principle and operation are the same as that described above, and thus the description will not be repeated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a boost circuit comprising the steps of:
   controlling a duty cycle of a power switch by controlling on and off of the power switch;
   realizing voltage boosting and regulating of the output voltage across an output capacitor using energy storage of an inductor; and
   reducing the reverse recovery current of a freewheeling diode through an auxiliary inductor connected in series with the power switch, wherein a secondary winding of the inductor is connected to an energy storage capacitor to supply the energy thereto, and to provide a path for the auxiliary inductor, thereby transferring the energy to the storage capacitor.

2. The method of claim 1 further comprising the steps of:
   the storage capacitor obtaining additional energy through the secondary winding of the inductor while storing the reverse recovery energy after the power switch is turned on; and
   the energy storage capacitor transferring the stored reverse recovery energy and the additional energy to the output capacitor during the freewheeling stage after the power switch is turned off.

3. An apparatus for a low loss boost circuit comprising a boosting circuit including a power switch, an inductor including a primary winding and a secondary winding, a freewheeling diode, and an output capacitor, the freewheeling diode being connected in series with an auxiliary inductor, wherein an energy storage circuit is provided and is connected across the cathode and the anode of the freewheeling diode and the ground, the energy storage circuit including the secondary winding of the inductor coupled to an energy storage capacitor.

4. The circuit of claim 3 wherein the energy storage circuit further includes first and second auxiliary diodes, the first auxiliary diode and the second auxiliary diode being connected between the secondary winding and the cathode of the freewheeling diode in series and wherein the energy storage capacitor is arranged between a junction which connects the first auxiliary diode and the second auxiliary diode and a junction which connects the freewheeling diode and the auxiliary inductor.

5. The circuit of claim 4 wherein the energy storage circuit further comprises a third auxiliary diode having an anode connected to a junction between the primary winding of the inductor and the power switch, and its cathode connected to the cathode of the freewheeling diode.

* * * * *